US012660765B2

(12) United States Patent
Juhl et al.

(10) Patent No.: US 12,660,765 B2
(45) Date of Patent: Jun. 23, 2026

(54) AIR DUCT FOR DISTRIBUTING AIR IN A GREENHOUSE

(71) Applicant: Cooling-Global s.r.o., Prague (CZ)

(72) Inventors: Christian Juhl, Prague (CZ); Christian Potma, LB Bergen (NL)

(73) Assignee: COOLING-GLOBAL S.R.O., Prague (CZ)

( * ) Notice: Subject to any disclaimer, the term of this patent is extended or adjusted under 35 U.S.C. 154(b) by 598 days.

(21) Appl. No.: 18/003,214

(22) PCT Filed: Jun. 24, 2021

(86) PCT No.: PCT/EP2021/067369
§ 371 (c)(1),
(2) Date: Dec. 23, 2022

(87) PCT Pub. No.: WO2021/260123
PCT Pub. Date: Dec. 30, 2021

(65) Prior Publication Data
US 2023/0309465 A1 Oct. 5, 2023

(30) Foreign Application Priority Data
Jun. 26, 2020 (EP) .................................... 20182451

(51) Int. Cl.
*A01G 9/24* (2006.01)
*B29D 23/00* (2006.01)

(52) U.S. Cl.
CPC ........... *A01G 9/246* (2013.01); *B29D 23/001* (2013.01); *B29K 2023/06* (2013.01)

(58) Field of Classification Search
CPC ...... F24F 13/02; F24F 13/072; F24F 13/0218; F24F 13/0209; F24F 13/0245; A01G 9/246; F16L 11/02
See application file for complete search history.

(56) References Cited

U.S. PATENT DOCUMENTS 4,382,401 A * 5/1983 Simmler ................. F24F 13/02
239/122
5,938,527 A * 8/1999 Oshima ..................... F24F 1/01
454/344

(Continued)

FOREIGN PATENT DOCUMENTS

NL 76439 A1 11/1954
NO 76439 C 11/1954

(Continued)

OTHER PUBLICATIONS

European Search Report Corresponding to EP 20182451 mailed Nov. 13, 2020.

(Continued)

*Primary Examiner* — Ko-Wei Lin
(74) *Attorney, Agent, or Firm* — Secant IP, PLLC

(57) ABSTRACT

Air duct for distributing air in a greenhouse, the air duct comprising a hollow main body extending along a longitudinal axis and at least one set of vents, wherein the main body has an outer surface and an inner surface, a first end and a second end at the opposite longitudinal ends of the main body, and a segment disposed between the first end and the second end extending over substantially the entire length of the main body, wherein the cross-sectional area of the main body in this segment decreases towards the second end, wherein the vents belonging to a respective set of vents are distributed at intervals over substantially the entire length of said segment, and wherein at least said segment of the main body is made from plastic.

16 Claims, 9 Drawing Sheets

(56)                    References Cited

U.S. PATENT DOCUMENTS

Figure 1A:
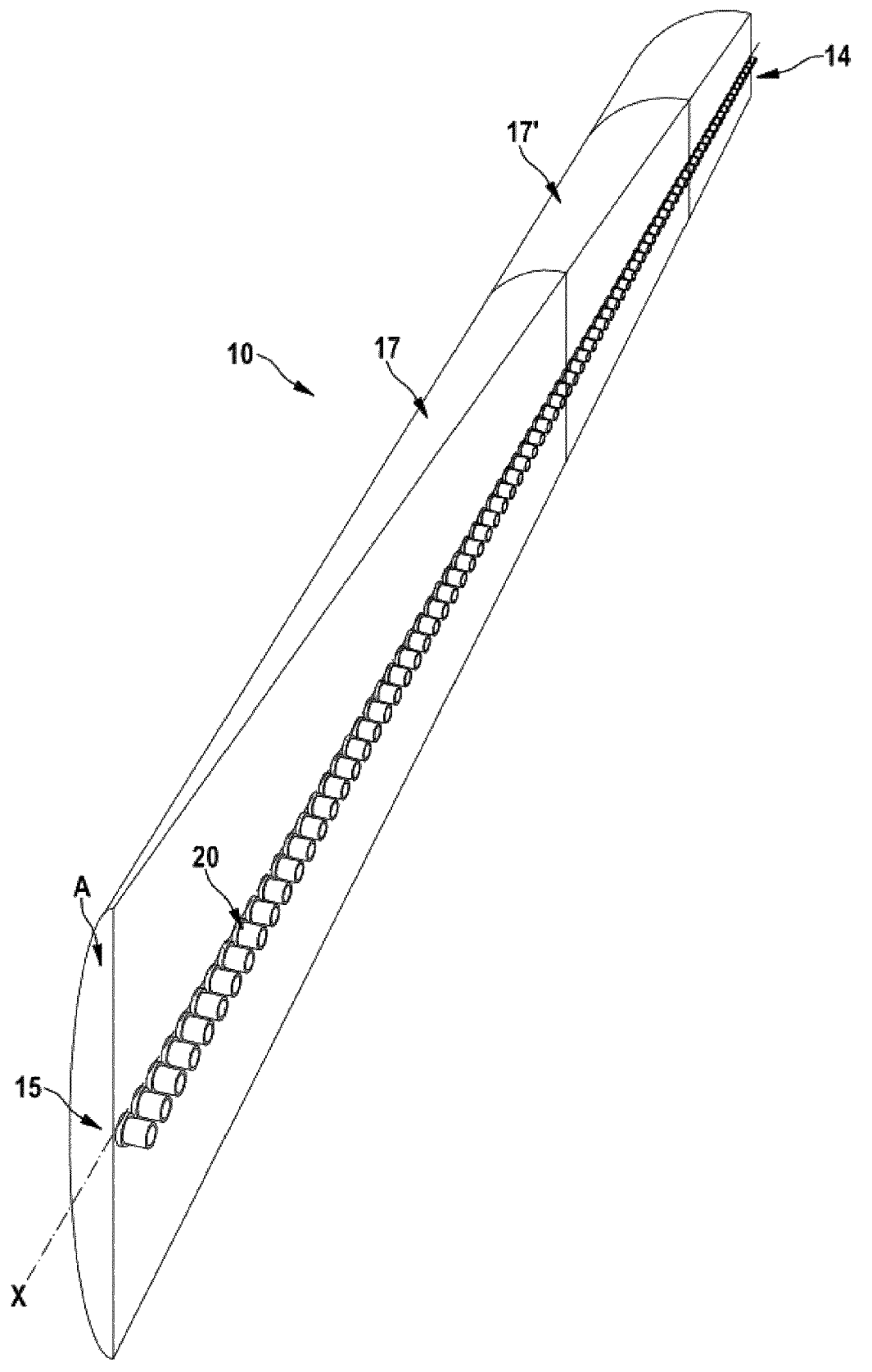

| | | | | |
|---|---|---|---|---|
| 2003/0022617 A1* | 1/2003 | Gebke | .................... | B01D 46/88 |
| | | | | 454/306 |
| 2006/0273491 A1 | 12/2006 | Bergsma et al. | | |
| 2012/0190293 A1* | 7/2012 | Badenhorst | ........... | F24F 13/065 |
| | | | | 454/284 |
| 2016/0273491 A1 | 9/2016 | Foege | | |

FOREIGN PATENT DOCUMENTS

| | | | |
|---|---|---|---|
| WO | 2018/111100 A1 | 6/2018 | |
| WO | 2019/185503 A1 | 10/2019 | |

OTHER PUBLICATIONS

International Search Report Corresponding to PCT/EP2021/067369 mailed Sep. 17, 2021(Previously Submitted).

Written Opinion Corresponding to PCT/EP2021/067369 mailed Sep. 17, 2021 (Previously Submitted).

International Preliminary Report on Patentability Corresponding to PCT/EP2021/067369 mailed Jan. 5, 2023.

International Search Report Corresponding to PCT/EP2021/067369 mailed Sep. 17, 2021, (Previously Provided).

Written Opinion Corresponding to PCT/EP2021/067369 mailed Sep. 17, 2021, (Previously Provided).

European Search Report Corresponding to 20182451.3 mailed Nov. 5, 2020.

W. Gouzhen et al., "Application of Plastics in the Chemical Industry", Chemical Industry Press, Aug. 31, 1985, pp. 382-383.

"Use and Maintenance of Vegetable and Horticultural Protected Area Machinery", Fang Buling, Jiangsu Science and Technology Press, Nov. 30, 1999.

Chinese Office Action Corresponding to 202180052268.8 issued Feb. 17, 2025.

* cited by examiner

AIR DUCT FOR DISTRIBUTING AIR IN A GREENHOUSE

The present invention relates to an air duct for distributing air in the cultivation space of a greenhouse, a method for manufacturing an air duct according to the invention, a greenhouse comprising an air duct according to the invention, a method for distributing conditioned air in a greenhouse, and the use of an air duct according to the invention for distributing air in a greenhouse.

Mass production of crops, for example tomatoes, is performed in greenhouses, the purpose of which is to protect growing crops from unstable external atmospheric conditions and to provide these plants with optimal conditions for their growth. Such conditions primarily include temperature and air humidity. These conditions are achieved in greenhouses by supplying air with the required temperature and humidity to the cultivation space of greenhouses using perforated conduits. It is desirable to secure a uniform lateral outflow from these conduits in order to provide the same growing conditions for the respective plants in the greenhouse and thus a common harvest time. As the length of greenhouses is several dozens of metres and sometimes more, the provision of constant conditions for all plants in greenhouses presents certain problems.

From the state of the art, climate systems for greenhouses are known in which the supply of temperature and humidity conditioned air takes place via conduits made of thin polymer foil having a set of holes through which the conditioned air enters the cultivation space of the greenhouse. However, as the supply of conditioned air is not continuous but rather in certain time intervals, such conduits deflate as soon as the supply of conditioned air ceases and the internal walls of collapsed conduits are prone to stick together. When starting a new cycle of supplying conditioned air, the drive of the ventilator electric motor blowing the conditioned air to the cultivation space would again consume significant part of the electricity needed for a repeated inflation of the conduit and supply of the air in the greenhouse. To prevent the condensation of water drops and the problem of collapsing conduits, the conduits must always be under a certain overpressure, i.e. the ventilator must run at all times. However, such climate systems feature a very high energy consumption. Another drawback of known climate systems for greenhouses is the gradual pressure loss of the conditioned air along the longitudinal axis of the conduits, which results in less and less conditioned air being supplied to the cultivation space of the greenhouse with increasing distance from the inlet of the conduit. To eliminate this drawback, the size and/or distance of the conduit's openings can be modified along the entire length of the conduit to ensure an even flow of conditioned air to the cultivation space of the greenhouse. However, this disproportionately increases the costs relating to the manufacturing of such conduits, not to mention the necessity of calculating the size and/or distance of the individual openings for each specific length of the conduit. Finally, the openings through which the conditioned air leaves the conduits are simple holes, gratings or slits, which give rise to certain undesirable effects that may occur during transport, for example a premature condensation of water from the air.

At least to some extent, the above listed drawbacks are overcome by a solution according to document WO 2018/111100 A1, where the air conduit is a flexible tube made of gas tight textile strengthened by stiffening elements, which render the conduits dimensionally stable and self-supporting. The conduit is positioned in a manner that constantly holds it in operational mode, i.e. a mode in which the conditioned air may flow through the conduit without any obstacles. Furthermore, the conduit has a gradually narrowing diameter from the input section towards the end section to facilitate the use of low pressure-loss nozzles. However, this solution also has disadvantages, as the flexible segments between the stiffening elements still react to pressure changes which results in bulges along the tube and thus a stable air flow from the conduits into the cultivation space of the greenhouse without high air pressure cannot be achieved. In addition, the operation of such conduits with simple openings is energy-intensive.

Hence, the current climate systems for greenhouses continue to be rather energy intensive and do not provide a cost-effective way to deliver conditioned air into the cultivation space of a greenhouse. Furthermore, the pressure required in the conduits known from the state of the art depends on the respective hole pattern in the tubes, the presence of single or double hose systems and whether direct heat changers or pad systems can be used.

The object of the invention is to remedy these and other disadvantages of the prior art and in particular to provide an improved air duct for providing conditioned air to the cultivation space of a greenhouse with reduced energy consumption.

To this end, the invention provides an air duct for distributing air in a greenhouse, a method for manufacturing an air duct according to the invention, a greenhouse comprising an air duct according to the invention, a method for distributing air in a greenhouse, and the use of an air duct according to the invention for distributing air in a greenhouse pursuant to the independent claims. Advantageous embodiments are the subject of the dependent claims.

According to the present invention, the air duct for distributing air, preferably conditioned air, in a greenhouse comprises a hollow main body extending along a longitudinal axis and at least one set of vents. The main body has an outer surface and an inner surface as well as a first end and a second end at the opposite longitudinal ends of the main body. The main body further comprises a segment between the first end and the second end which preferably extends over substantially the entire length of the main body. Within this segment, the cross-sectional area of the main body decreases towards the second end. The vents belonging to a respective set of vents are distributed at intervals over substantially the entire length of said segment, wherein at least the vent-comprising segment of the main body is made from plastic.

As understood herein, "substantially" means that the ratio of the length of the segment (L2) to the total length of the main body (L1) is more than 0.9:1, preferably more than 0.95:1. The term "cross-sectional area" as used herein refers to the internal dimensions of the main body, i.e. the area of the main body through which the conveyed air flows.

In a preferred embodiment, at least the segment comprising the vents is made of a substantially air-impermeable plastic film.

By manufacturing the vent-comprising segment, preferably the entire main body, from thermoplastic polymer film, the manufacturing of the air duct can be particularly economical.

In a preferred embodiment of the air duct described herein, the vents of a respective set of vents comprised in the segment are arranged on a geodesic line during the intended use of the air duct, i.e. when air is conveyed through the air duct.

In the context of the present specification, a "decrease towards the second end" means that the cross-sectional area of the air duct decreases continuously, at least over the said vent-comprising segment, towards the second end. In particular, however, this does not mean a simple linear decrease of the cross-sectional area but a decrease according to a special shape of the hose, as will be explained in more detail below.

In a preferred embodiment, the segment is configured to maintain uniform static pressure along its length, preferably the change in cross-sectional area along the segment is based on equation (1):

$$\frac{A}{A_L} = \left\{ \left(1 + \frac{fL}{2D_L}\right)\left(\frac{x}{L}\right)^{1/2} - \frac{fL}{2D_L}\frac{x}{L} \right\}^2 \quad (1)$$

in which A refers to the cross-sectional area of the air duct; D refers to the diameter of the air duct or the hydraulic diameter for noncircular ducts; f refers to the friction factor for fully developed air duct flow; L refers to the length of the air duct or the segment under consideration; x refers to the distance along the air duct from the closed second end; and L as subscript refers to conditions at the beginning of the vent-comprising segment.

By designing at least the segment according to equation (1), a uniform static pressure can be achieved along the length of the vent-comprising segment while keeping the vent area per unit length constant. This allows the use of nozzles with low pressure loss and their arrangement at regular, constant distances along the air duct or relevant segment thereof. This also makes the production of the air duct according to the invention much more cost-effective.

The friction factor f varies with flow conditions, i.e. the Reynolds number inside the air duct changes in longitudinal direction which also leads to changes in the friction factor f at different positions along the air duct. The Reynolds number is a function of the cross-sectional area multiplied by the average velocity at that location in the air duct. In the case of the present application the velocity remains approximately constant along the conduit which, due to its decreasing cross-sectional area, concomitantly leads to a decreasing Reynolds number and changes in the friction factor f along the length of the conduit.

Accordingly, further optimization of the segment's cross-sectional profile can be achieved by calculating the friction factor at several points along the segment, preferably continuously over the entire length of the segment.

In a preferred embodiment, the change of the friction factor f along the segment is used to calculate the cross-sectional area at a given position along the segment according to equation (1). The following equation (2) is applicable for this purpose:

$$f = \frac{0.25}{\log\left(\frac{\varepsilon/D}{3.7} + \frac{5.74}{Re^{0.9}}\right)^2} \quad (2)$$

in which f refers to the friction factor; ε refers to the absolute roughness coefficient of the material used for the air duct's interior; D refers to the diameter of the air duct or the hydraulic diameter for noncircular ducts at a given position along the air duct; and Re refers to the Reynolds number. The values for the friction factor f obtained using equation (2) are used in equation (1) to calculate the cross-sectional areas along the conduit, i.e. going from one section to another in conduit direction. As will be apparent for the person skilled in the art, the next cross-sectional area is then calculated using the respective friction factor f at that next cross-sectional area along the conduit.

Furthermore, the pressure loss over the vents depends on the flow angle at the inlet of the vents. This angle is different at the beginning of the segment than at the end. Albeit this pressure difference is small by comparison to the factors described above, it is conceivable that the cross-sectional areas along the segment are adjusted for this pressure difference from the beginning to the end of the air duct as well.

Due to the shape of the air duct according to the invention that is not rotationally symmetrical and because the main body inflates with air during its intended use, the vents on the surface of the main body are arranged on a curve rather than in a perfectly straight line. These curves depict geodesic lines, which become straight lines when curved surfaces are unwound into the plane.

The arrangement of the vents on geodesic lines is preferred because it enables a particularly cost-efficient production of the air ducts according to the invention, namely starting from two-dimensional plastic films, for example in a roll-to-roll process. Before inflating the main body, the vents of a respective set will be arranged essentially on a straight line.

In a preferred embodiment of the air duct described herein, the vents are uniformly distributed from one another, wherein the interval (d) between adjacent vents of a respective set of vents is between 5 mm and 100 mm. More preferably, the interval (d) between vents of an set of vents is between 40 mm and 60 mm. In each case, the distances are to be measured from the respective centers of the vents.

The shape of the air duct according to the invention enables the distance between adjacent vents to be constant and within the value range specified herein. By arranging the vents at a fixed distance from each other along the main body, production can be greatly simplified and high volumes of air ducts with consistent properties and quality can be achieved.

In a preferred embodiment, the air duct described herein comprises two sets of vents. In this case, the two sets of vents are arranged substantially mirror-symmetrical to the median longitudinal plane of the air duct.

The term "median longitudinal plane" as used herein refers to the plane which, during the intended use of the air duct, passes through the centre line of the main body and extends vertically and longitudinally of the main body.

By providing two or more sets of vents, conditioned air can be introduced into the greenhouse at a number of locations, e.g. along two sides of a plant table.

In a preferred embodiment of the air duct described herein, the vents are configured as nozzles which protrude from the outer surface of the segment.

The inventors found out through computer simulations and subsequent experiments that significant savings in the consumption of electricity can be achieved through the use of an air duct comprising a non-linear tapering cross-section and vents protruding from the outer surface of the main body. Moreover, it was found that an approximately constant, low pressure drop occurs across the nozzles over essentially the entire length of the air duct disclosed herein. Hence, the conditioned air is evenly introduced into the greenhouse along the entire length of the air duct, i.e. with a uniform speed and air flow from the nozzles, which benefits the uniform growth and maturation of the cultivated plants. In particular, the inventors found that energy savings may be achieved in the operation of the air duct on the level of nozzles that have so far been simple vents on the side of the air ducts known from the state of the art. It was identified that, immediately after the exit of the conditioned air from these simple vents, an air flow in longitudinal direction of the air duct occurs unintentionally, which hampers the conditioned air from exiting from these nozzle openings unhindered. In addition, it was found that if the vents are designed as nozzles and if the nozzles are arranged successively in a row along the air duct, the energy consumption for operating the air duct is significantly reduced. Moreover, the particularly low pressure drops encountered with the air ducts disclosed herein allows for the use of smaller ventilators and therefore also air ducts with a smaller maximum diameter at the point where the air enters the main body. This makes the air duct more compact and helps to create more space for additional planting tables. On the other hand, the maximum length of an air duct can be significantly increased while maintaining the same diameter where the air enters the air duct, which means that in the greenhouse layouts typically used today, the number of ventilators required can be halved.

The achievement of energy savings is surprising and unexpected as it would rather be assumed that a sudden change in the direction of air flow, i.e. air that exiting the air duct at approximately perpendicularly to the direction of air flow in the air duct, would reduce and decelerate the air flow through the air duct. On the contrary, a very low loss of pressure is observed in the air duct according to the invention and the air duct may be operated using a very low pressure of only several Pa units, which is positively reflected in a very low energy consumption relating to the operation of the air duct according to the invention.

In a preferred embodiment of the air duct described herein, the nozzles each have a substantially circular air inlet opening with a corresponding inlet diameter at the level of the main body's outer surface, a substantially circular air outlet opening spaced substantially parallel to said air inlet opening and having an outlet diameter, and a perpendicular distance between the air inlet opening and the air outlet opening, wherein the air inlet opening is larger than the air outlet opening and wherein the ratio between the perpendicular distance and the outlet's diameter is between 0.5 and 3, preferably between 1.5 and 2.5.

Through the use of nozzles as specified above, a particularly low pressure loss across the nozzles and a particularly energy-saving operation of the air duct can be achieved.

Preferably, the inner surface of each nozzle comprises a cylindrical region with a substantially constant inner diameter and a transition region in which the inner diameter increases towards the main body of the air duct described herein. The inner diameter of the cylindrical portion corresponds to the diameter of the air outlet opening and the radius of said transition region is between 0.05 and 0.5 of the outlet diameter. Even more preferably, the radius of said transition area is between 0.1 and 0.2 of the outlet diameter.

By designing the nozzles as described herein, a particularly low pressure loss across the nozzles can be achieved.

In a preferred embodiment, at least the tapering segment and the nozzles are formed in one piece. More preferably, the entire main body and the nozzles are formed in one piece.

Such a one piece construction can be manufactured particularly efficiently and economically.

In a preferred embodiment, the main body of the air duct disclosed herein comprises a plurality of segments which are connected and/or connectable to each other end-to-end in a sealed manner. In this case, a new, extended segment is formed by joining several segments together, whereby all segments are naturally configured such that the cross-sectional area decreases continuously from the first end towards the second end of the air duct, at least over the range of the newly formed extended segment.

Such an air duct still comprises only a few parts and is therefore particularly easy to manufacture and assemble. Yet, the length of the air duct can be flexibly chosen on a case-by-case basis through the possibility of adding or removing segments. This way, very long air ducts for greenhouses with unprecedented main body lengths can be obtained.

In a preferred embodiment, the air duct disclosed herein further comprises a hollow enclosing body with an outer surface and an inner surface. The enclosing body encloses the main body of the air duct at least partially in the direction of the longitudinal axis of the main body such that a gap is formed between the inner surface of the enclosing body and the outer surface of the main body. The main body and the enclosing body are connected to each other via at least some of the nozzles belonging to a respective set of vents, preferably via substantially all of the nozzles of a respective set of vents in order to enhance the stability of the air duct. In this multilayer embodiment, the nozzles protruding from the outer surface of the main body open into vents arranged in the enclosing body. Additionally or alternatively, the nozzles extend through vents in the enclosing body and protrude from the outer surface of the enclosing body. In each embodiment, the interior volume of the main body is in fluid communication with the environment surrounding the air duct via the nozzles. The main body and the enclosing body thus form two layers of a multilayer construction.

It was found that the air conveyed in the air duct exhibits a temperature gradient. This temperature gradient originates, by way of example, from the fact that the air moving slowly through the air duct either decreases or increases depending on the ambient temperature of the air duct, without wishing to be limited to this explanation. A multilayer construction of the air duct as disclosed herein has the advantage that this change in temperature can be minimized and that the air leaving the nozzles has a largely uniform temperature and humidity along the entire length of the air duct. Put differently, the gap formed between the enclosing body and the main body acts as an insulating layer which at least reduces the equalization of the temperature of the air conducted in the air duct and the ambient air in the greenhouse, i.e. the environment.

In a particularly preferred embodiment, the enclosing body encloses the main body over substantially the entire length of the main body in the direction of the longitudinal axis of the main body, i.e. from the first end to the second end of the main body, thereby increasing the insulating effect described hereinabove.

In a preferred embodiment of the multilayer air duct disclosed herein, the enclosing body of the air duct described herein is made from plastic, preferably of a substantially air-impermeable plastic film. Such an air duct can be manufactured particularly inexpensively as described herein. In particular, it is especially preferred if both the main body and the enclosing body are made of a substantially air-impermeable plastic film, because this enables a particularly lightweight design of the air duct, an easy and quick assembly and allows for transportation in a space-saving manner.

In a preferred embodiment of the multilayer air duct disclosed herein, the nozzles are fixed to the enclosing body by means of a form-locking connection and/or a joining method. This allows the position of the enclosing body relative to the main body to be fixed. In a particularly preferred embodiment, the nozzles are connected to the enclosing body by a snap lock connection consisting of a latching element and at least one suitable retaining element arranged on the nozzle. Such fastening can be reversed and thus allows for the disassembly of the air duct if necessary. Alternatively or in addition, the nozzles are glued to the enclosing body or welded to the enclosing body. Such fastening is particularly cheap and safe to manufacture.

In a preferred embodiment of the multilayer air duct disclosed herein, the connection between each of the nozzles and the enclosing body is formed to be substantially gas-tight. This renders the gap formed between the inner surface of the enclosing body and the outer surface of the main body pressurizable and particularly suitable as an insulating layer. In this embodiment, the air duct may optionally further comprises means for applying a fluid to the gap formed between the inner surface of the enclosing body and the outer surface of the main body. This allows, for example, specially tempered gas to be introduced into and discharged from the gap, if necessary also at different points in the longitudinal direction of the air duct. This way, an optimum control of the temperature gradient of the air to be distributed in the greenhouse can be achieved.

The object is further achieved by a method for manufacturing an air duct as disclosed herein. The method comprises the steps of: i) Providing a heat-sealable film of thermoplastic material, preferably a polyethylene film; ii) welding said film to form a tapered main body and/or segment thereof with a first end and a second end, wherein the cross-sectional area of the main body and/or segment thereof decreases from the first end to the second end; and iii) creating vents in the film, either before or after step ii).

Through the use of the method described herein, the air ducts disclosed herein can be manufactured in a safe and cost-efficient manner.

It will be understood from the information disclosed in this specification that the machine used to create a main body with a non-linear tapered cross-section, for example according to at least one of equations (1) and (2), in step ii) of the procedure described herein, must be designed accordingly.

In one embodiment of the method described herein, the vents are configured as nozzles which are created by the following steps, preferably in consecutive order: Feeding the film to a vacuum roller comprising dimples; sucking the film into the dimples on the roller to form plastic deformations protruding from the side of the film facing the roller, wherein the plastic deformations thus obtained have substantially the shape of the dimples; and wherein the vents in step iii) are created by punching out the bottom of said deformations.

It will be obvious to the person skilled in the art that punching out the respective bottoms of the plastic deformations in the film serves to form the respective air outlet openings of the resulting nozzles. The shape and size of the air outlet openings is essentially determined by the shape and size of the tool used for punching the film.

In principle, a very long air shaft with a large number of nozzle arrangements and a length of several hundred metres can be produced cost-effectively using such a process.

In another embodiment of the method disclosed herein, pre-formed nozzles are inserted in the main body comprising a plurality of holes where the nozzles are to be arranged. In this embodiment, the method further comprises the steps of providing prefabricated nozzles. Each nozzle comprises a substantially circular air inlet opening with a respective inlet diameter and a substantially circular air outlet opening with a respective outlet diameter. The air outlet opening is spaced substantially parallel to said air inlet opening at a perpendicular distance and the diameter of the air inlet opening is larger than the diameter of the air outlet opening. The ratio between said perpendicular distance and the outlet diameter is between 0.5 and 3, preferably between 1.5 and 2.5. Moreover, the method comprises the steps of creating a plurality of holes in the film and inserting the nozzles into the said holes. The nozzles are inserted into the holes from the film side that is or will become the inside of the main body and with the air outlet opening first. Afterwards, the nozzles are fixed to the film by means of a form-locking connection and/or a joining method. Preferably, the nozzles are fixed to the film by a snap lock connection consisting of a latching element and at least one suitable retaining element arranged on the nozzle. The snap lock connection is made by pushing the latching element onto the respective nozzle from the film side that is or will become the outer surface of the main body.

Such a method allows, on the one hand, to provide air ducts with a precisely defined nozzle geometry and thus with a minimized pressure loss and, on the other hand, to simply replace damaged nozzles if necessary.

In yet another embodiment of the method disclosed herein, the vents are configured as nozzles which are created by feeding the film to a forming device for producing plastic deformations in the film, wherein the vents in step iii) are created by punching out the bottom of said deformations. Preferably, the film is fed to the forming device folded. This way, several layers of the film are simultaneously deformed from one side of the folded film.

By means of such a process, the air duct according to the invention can be manufactured particularly easily and economically.

In this context, it is of course understood that those nozzles which were produced on the film side facing the male part of the tool will first point into the interior of the main body when the air duct is inflated for the first time. Thus, those nozzles have to be pushed out of the main body's interior by overpressure in the air duct and/or manually in order to arrive at the air duct according to the invention.

In order to provide a multilayer air duct as described herein, the method according to the invention comprises in yet another embodiment the steps of: iv) Providing a further heat-sealable film of thermoplastic material, preferably a polyethylene film; v) forming a hollow enclosing body with said further heat-sealable film of thermoplastic material enclosing the main body at least partially in the direction of the longitudinal axis of the main body, preferably over substantially the entire length of the main body from the first end to the second end of the main body; vi) connecting the main body and the enclosing body via at least some of the nozzles of the main body, preferably via substantially all of the nozzles of the main body; and vii) creating vents in the enclosing body, wherein the spacing of the vents from one another and the size of the vents in the enclosing body corresponds essentially to the spacing of the nozzles from one another and to the outer diameter of the nozzles at the nozzle outlet opening in the main body. This way, the vents are created such that the interior volume of the main body is in fluid communication with the environment via the nozzles. Step vii) is performed either before or after step vi).

With such a method, a multilayer air duct comprising at least an inner wall, i.e. the main body, and an outer wall, i.e. the enclosing body, can be easily manufactured. The gap formed between the inner wall and the outer wall, more specifically between the outer surface of the main body and the inner surface of the enclosing body, serves as an insulation layer. The width of the gap is essentially limited by the nozzle height, i.e. the perpendicular distance between the air inlet opening and the air outlet opening of the nozzle. However, if the nozzles protrude from the outer surface of the enclosing body, the gap width can also be significantly smaller than the nozzle height.

The object is further achieved by a greenhouse comprising at least one air duct as disclosed herein.

The object is further achieved by a method for distributing air with an air duct as disclosed herein in a greenhouse. The method comprises the steps of: Providing conditioned air with pre-determined humidity and/or temperature at the first end of the air duct; conveying said conditioned air from the first end in the direction of the second end of the air duct, in particular by means of an electrically powered ventilator arranged upstream of the air duct; and supplying said treated air into the growing section of a greenhouse via the vents, whereby the air flow exiting through the vents is essentially the same between all vents.

Through the use of a method as described herein, the ventilation of a greenhouse is particularly energy-efficient and the plants planted in the greenhouse are evenly supplied with conditioned air.

The object is further achieved by the use of an air duct as disclosed herein for distributing air in a greenhouse, in particular a greenhouse as disclosed herein.

It is also possible that the air duct comprises a first end that is adapted for connection to an air supply and a second end which is sealed or sealable.

By designing the first end connectable to an air supply, for example by designing the first end as a flange or by providing a receptacle for a suitable sealing element which is inserted between the first end and the air supply, an air tight connection can easily be made and the air duct according to the invention can be retrofitted into existing air conditioning systems of greenhouses.

By providing a reversibly closable second end, the air duct described herein can be easily extended by suitable segments if required, thus providing a particularly cost-efficient modular air duct system. Moreover, the creation of local overpressure in the closed-end zone of the main body can be avoided by providing an opening in the second end, which creates a better climate by also ventilating a center path running along the front of the air duct, for example. In the event that the second end of an air duct described herein is opened and the air duct is enlarged longitudinally by a suitable further segment, the original second end is naturally omitted and a new second end is formed by the end of the newly added main body segment facing away from the first end.

It is also according to the invention that the air duct described herein comprises a circular cross-section.

Such circular transverse sections are particularly preferred in terms of fluid mechanics and can also be produced particularly easily as will be understood by a person skilled in the art.

Numerous ways exist to suspend the air ducts according to the invention, including suspension from a horizontal overhead wire using a plurality of clamp-type hangers or loops of cord encompassing the duct and wire. In the clamp-type hanger, a flat bar positioned inside the air duct is inserted in a channel positioned outside the air duct so that a portion of the air duct is clamped between the bar and channel. A snap ring is then inserted through an aperture in the channel and around the overhead wire to suspend the bar, channel, and air duct form the wire. However, suspending the air duct with such clamp-type hangers is generally a time-consuming and tedious task. Additionally, as such hangers are relatively costly and many are required to suspend the air duct, use of such hangers is somewhat expensive. While the use of spaced apart loops of cord is less expensive, the installation is rather time-consuming.

Therefore, it is also conceivable that the air duct described herein is adapted for single suspension along its longitudinal axis.

The term "single suspension" as used herein refers to an installation type in which the means for suspending the air duct are arranged in a single row on the air duct. In the state of the art, the terms "single-row suspension", "single-line hanging", "single-row H-track" or "single-row H-rail" are also used in this context.

In contrast, suspending the air duct disclosed herein from two locations, e.g. top left and top right, or in another way that effects changes in the cross-sectional shape of the inflated air duct is to be avoided according to the invention. Such changes in the cross-section compromise the whole design as the cross section is no longer decreasing continuously along the longitudinal axis of the air duct and the air flow inside the air duct is disturbed, which ultimately leads to increased energy consumption.

It is also according to the invention that the air duct disclosed herein further comprises a longitudinally extending fin for suspending the air duct. The fin comprises a plurality of apertures which are spaced at intervals along the fin and are preferably reinforced, for example in the form of heat-sealed areas and/or metal eyelets. In this embodiment, the fin and the main body are formed in one piece.

One way of making the fin is to join the sidewall of the main body, i.e. the inner surface, to itself face-to-face along the longitudinal axis of the main body. By way of example, welding is carried out such that two tubes with different diameters are formed, which are connected by a common weld seam. The smaller of the two tubes is typically the fin and has a constant cross-section in the longitudinal direction, whereas the larger of the two tubes constitutes the actual main body and tapers in the longitudinal direction. Portions of the fin may be reinforced by heat-sealing the double walls of the fin together to form longitudinally spaced reinforced regions for engagement by means for suspending the air duct. Alternatively or in addition, the fin can be provided with metal inserts or eyelets.

By providing the air duct with a fin as described herein, the installation of an air duct as described herein can be facilitated. Furthermore, the problem of tearing can be avoided by reinforcing the relevant portions of the fin.

It is also conceivable that the main body of the air duct disclosed herein further comprises means for detachably fixing the air duct to the underside of a plant table. In particular, said means for detachably fixing the air duct to the underside of a plant table are provided on the outside of the main body at the intersection with the median longitudinal plane of the air duct disclosed herein.

Through the provision of fastening elements, e.g. bolts and rivets, on at least one of the top parts of the air duct, a particularly simple installation of the air duct at the underside of a plant table can be achieved.

It is also conceivable that the top of the air duct disclosed herein, for example a fin extending along the longitudinal direction of the air duct, is not suspended horizontally from a respective anchoring support, for example the underside of a plant table. In this case, due to the tapering cross-sectional shape of the air duct, the distance between the air duct and the horizontally running anchoring support would increase in the longitudinal direction towards the second end of the main body. It is also evident that in this case the means of suspension or fastening of the air duct must be of varying lengths in the longitudinal direction in order to keep the vents on a horizontal line, i.e. for example parallel to the underside of the plant table from which the air duct is suspended.

It is also conceivable that the main body of an air duct according to the invention comprises at least one form-retaining element, preferably a plurality of form-retaining elements distributed substantially over the entire length of the main body.

The provision of a form-retaining element, e.g. in form of rings or spirals disposed inside the main body, prevents the main body from collapsing and the inner surfaces of the main body from sticking together in the event of a pressure drop or when no air is conveyed through the air duct.

It is also according to the invention that the segment with decreasing cross-sectional area described herein comprises at least one top part and at least one bottom part. The top part and the bottom part are connected or connectable to each other in a sealed manner. The top parts have a cross-section that remains essentially constant over substantially the entire length of the segment and the bottom parts are each configured such that the cross-sectional area of the extended segment decreases towards the second end of the main body.

In this case, two parts arranged one above the other in the longitudinal direction, one of which is substantially identical in design and the other has a tapered cross-sectional area, form a segment of an air duct according to the invention. This segmentation makes it possible to provide even very long air ducts and/or air ducts with flexibly selectable lengths. Such air duct segments can be manufactured, stored and transported more easily than continuous, one-piece air ducts. Moreover, if necessary, such air ducts can be readily extended or shortened at a later date by connecting or removing a certain number of top parts and a matching number of bottom parts in longitudinal direction each. The lower parts are each designed in such a way that they have a continuously tapering cross-sectional area—provided of course that they are assembled in the correct order. It is understood that the lower parts each have essentially the same width and length compared to the upper parts, but a different depth, i.e. bulge, with the slope of each lower part being essentially the same. The main body of an air duct according to the invention, which concomitantly also tapers in longitudinal direction, is thus obtained after connecting all upper and lower parts.

Preferably, the segment described herein further comprises one or more middle parts disposed between the top part and the bottom part. The middle parts extend over substantially the entire length of the segment and are connected or connectable to the at least one upper part and the at least one lower part in a sealed manner. In this case, the nozzles are arranged on the middle parts.

In a preferred embodiment of the air duct described herein, the middle parts and the nozzles are formed in one piece.

By providing the nozzles on a separate component, i.e. on the middle part, the production and the assembly of the nozzles on the main body can be simplified. In this way, the air duct according to the invention can be produced particularly cost-effectively and in large quantities, for example by injection moulding.

According to the invention it is conceivable, for example, that the main body, or a segment of the main body, comprises a top part with a longitudinally constant cross-section without curvature, two middle parts with a longitudinally constantly curved cross-section comprising the nozzle openings, and a bottom part with a longitudinally continuously tapering cross-section, wherein the two middle parts are arranged between the top part and the bottom part.

It is understood that relative terms such as "top", "middle", "bottom", and similar terms, may be used herein to describe a relationship of one feature to another. Although the respective orientations given herein generally refer to the spatial arrangement during the intended use of the air duct, i.e. in installed condition, it is understood that these terms are intended to encompass different orientations in addition to the orientation depicted in the figures.

Embodiments of the invention are further described in more detail with reference to the accompanying figures, wherein like reference signs are used to refer to the same or corresponding elements. The different views and illustrations of the embodiments shown in the figures are schematic illustrations of idealized embodiments of the invention and provided by way of example only. As such, embodiments of the invention should not be construed as limited to the particular shapes of the regions illustrated herein but are to include deviations in shapes.

Figure 1B:
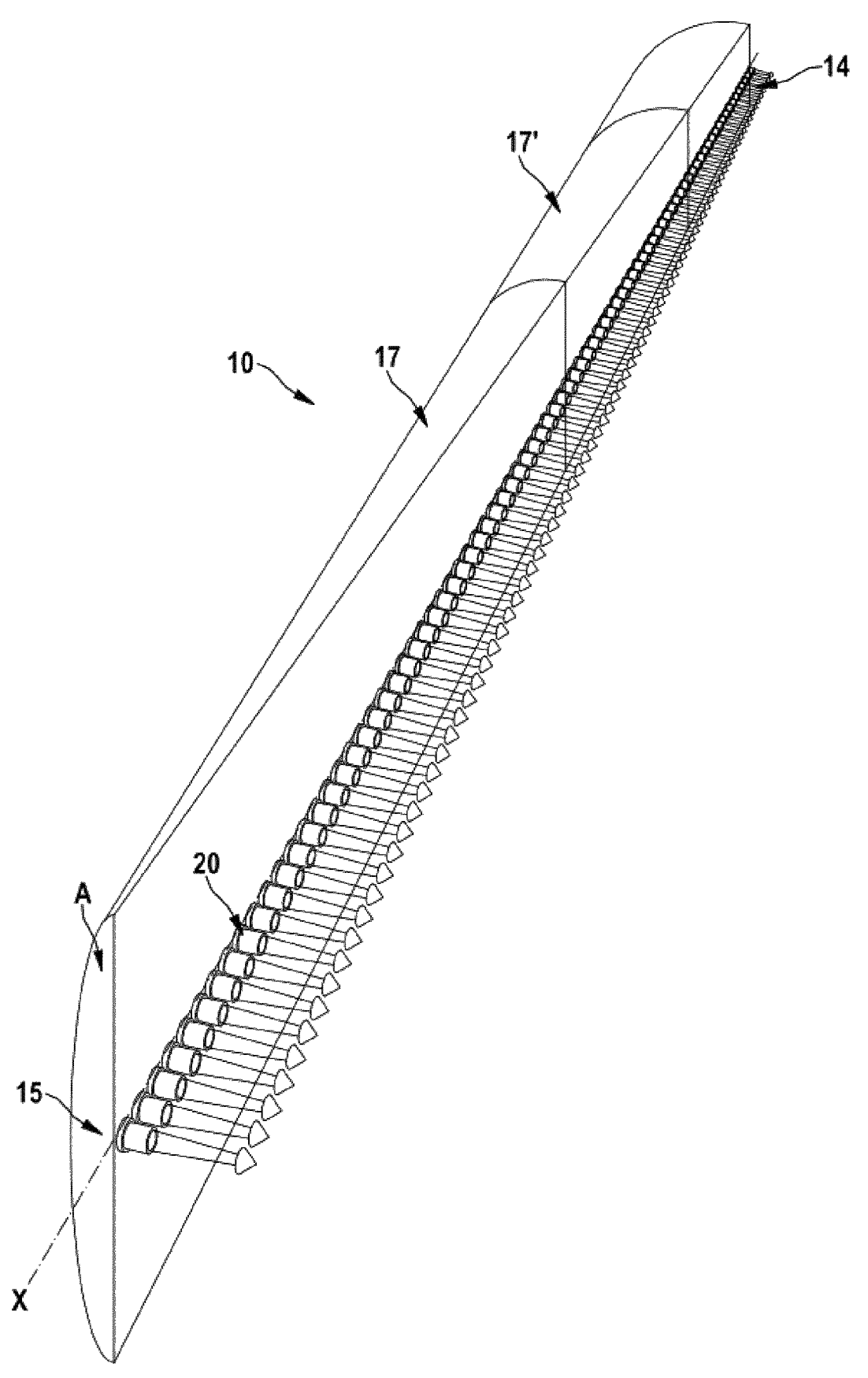
Figure 2:
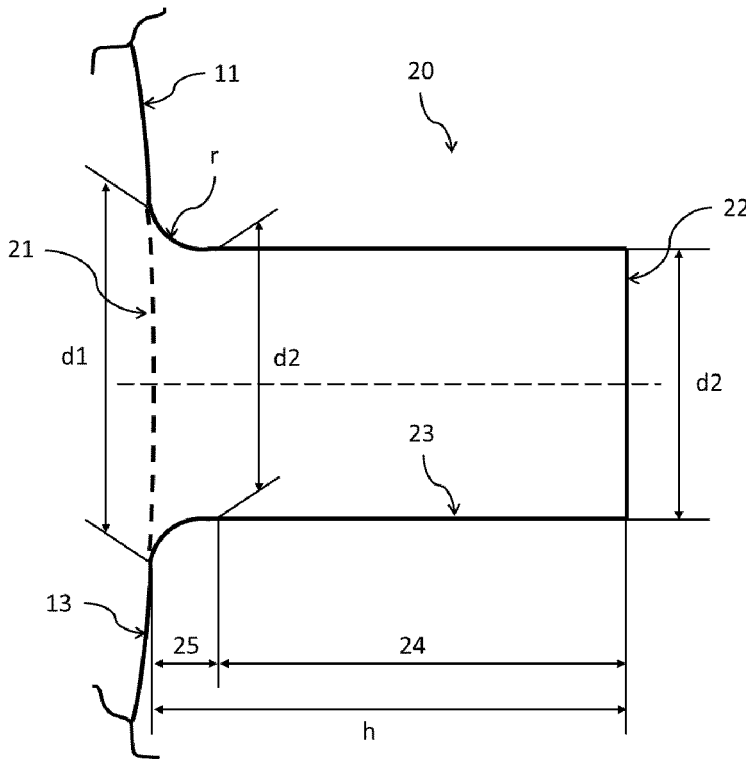
Figure 3:
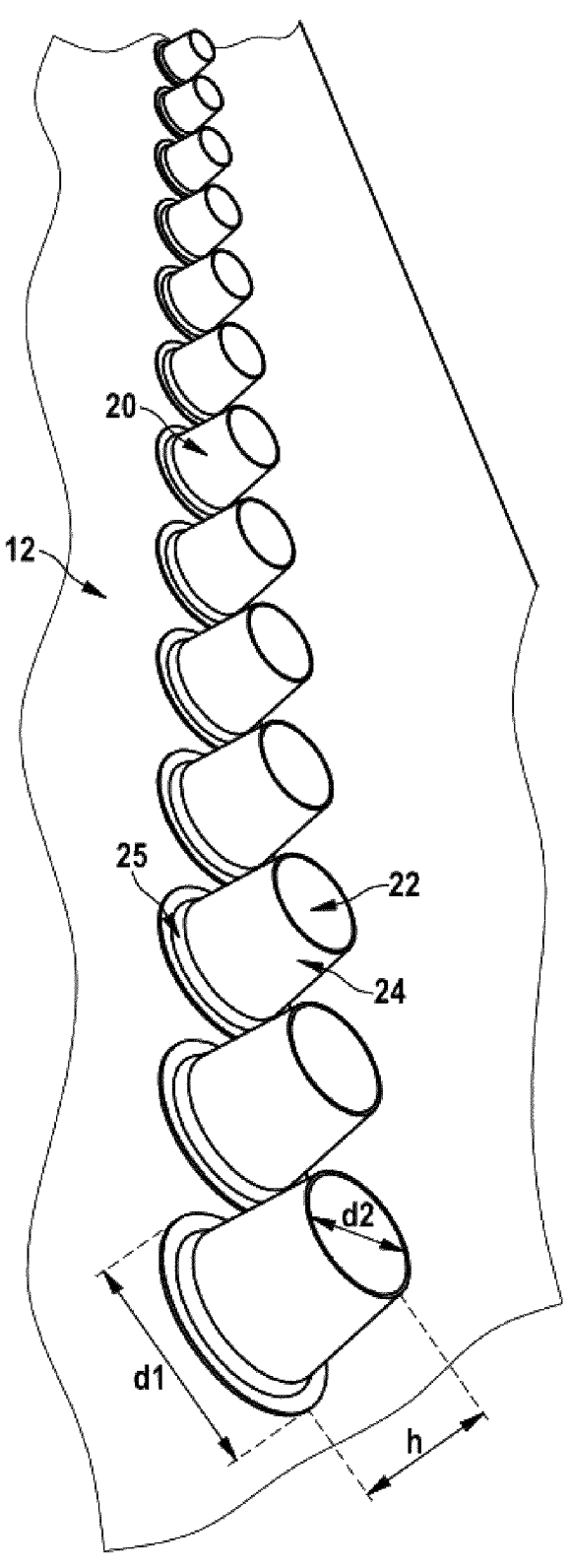
Figure 4A:
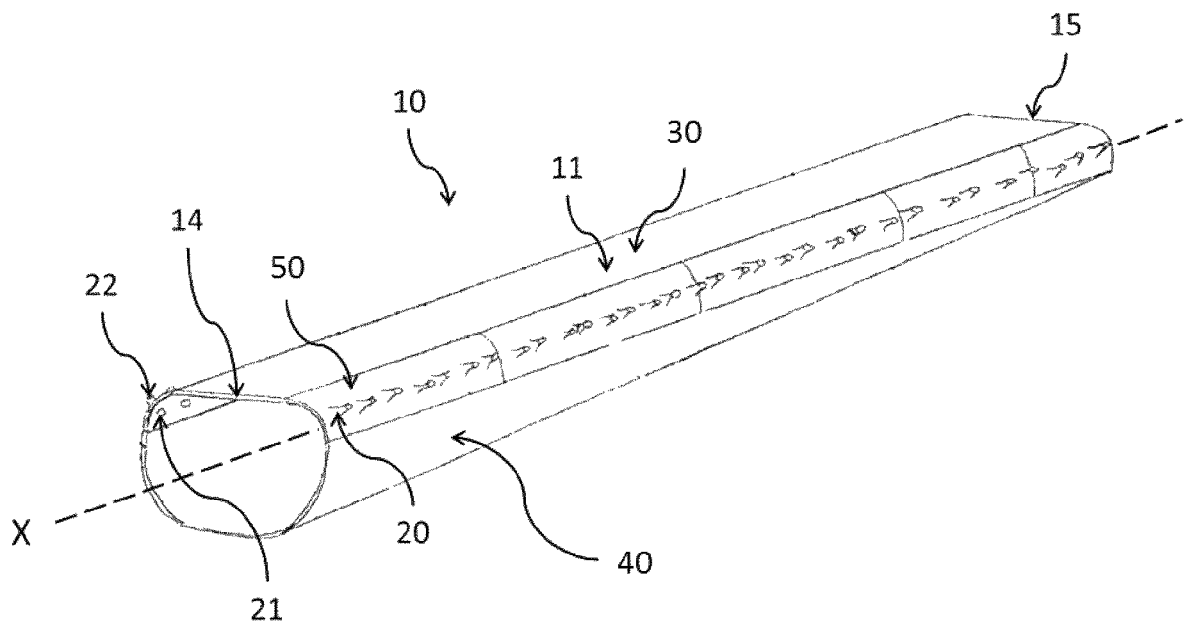
Figure 4B:
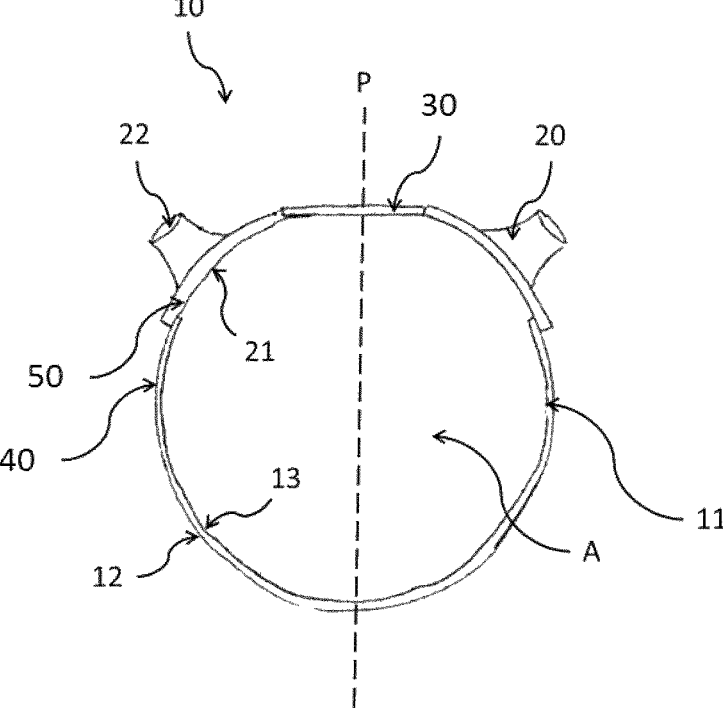
Figure 5:
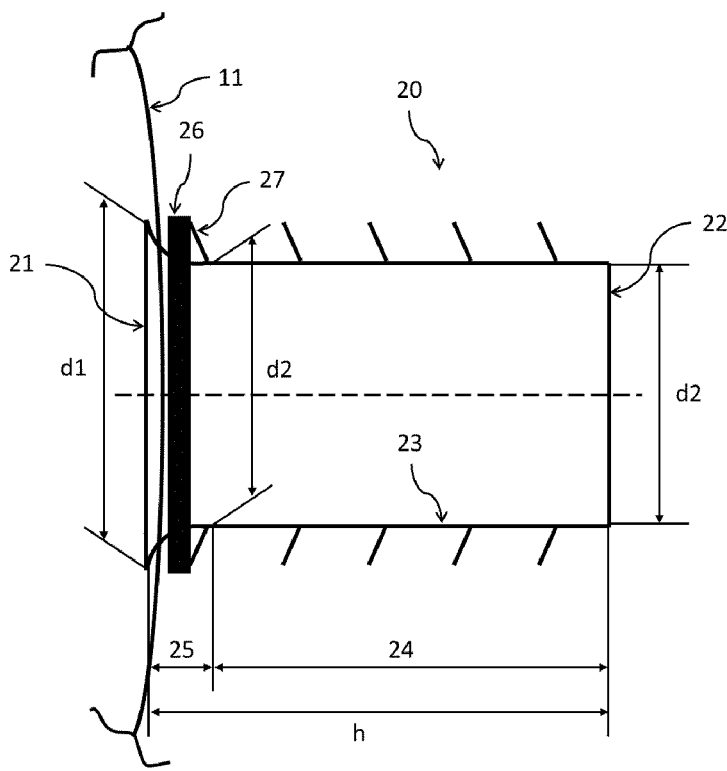
Figure 6:
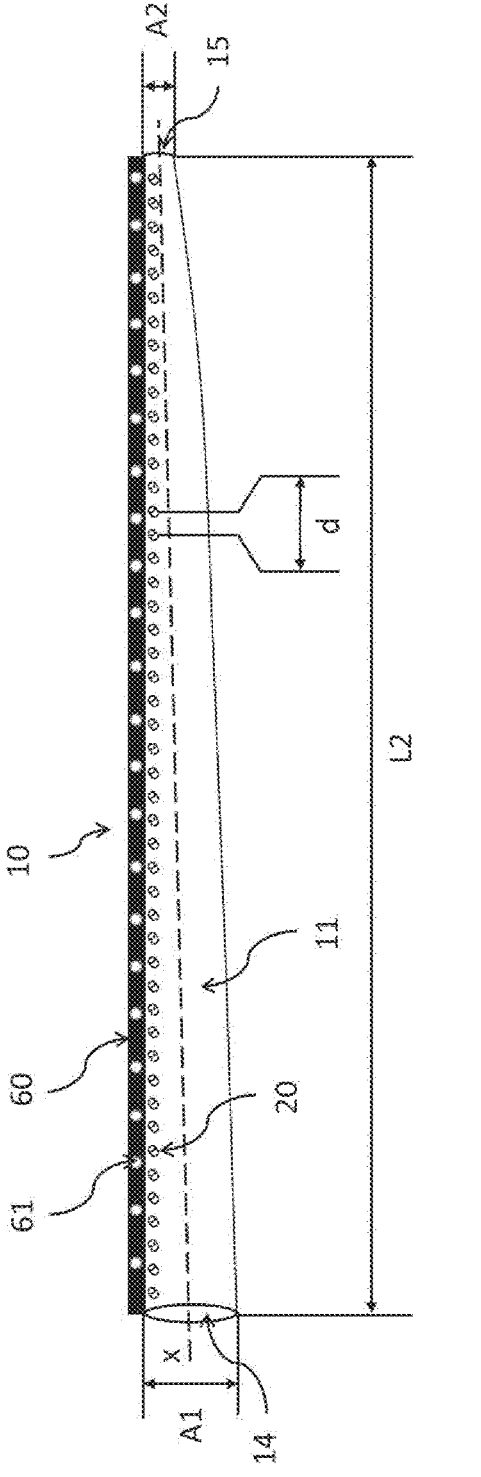
Figure 7:
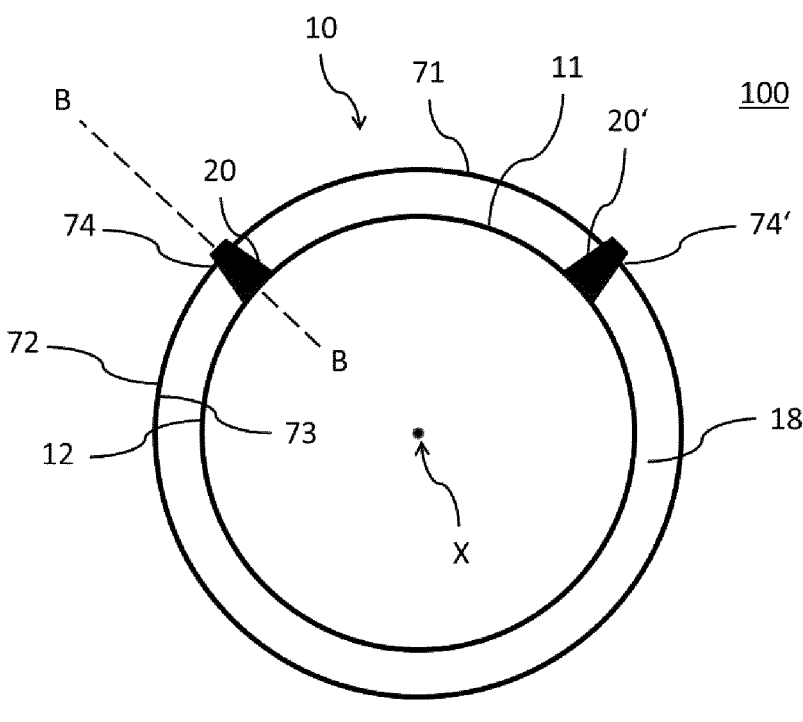
Figure 8A:
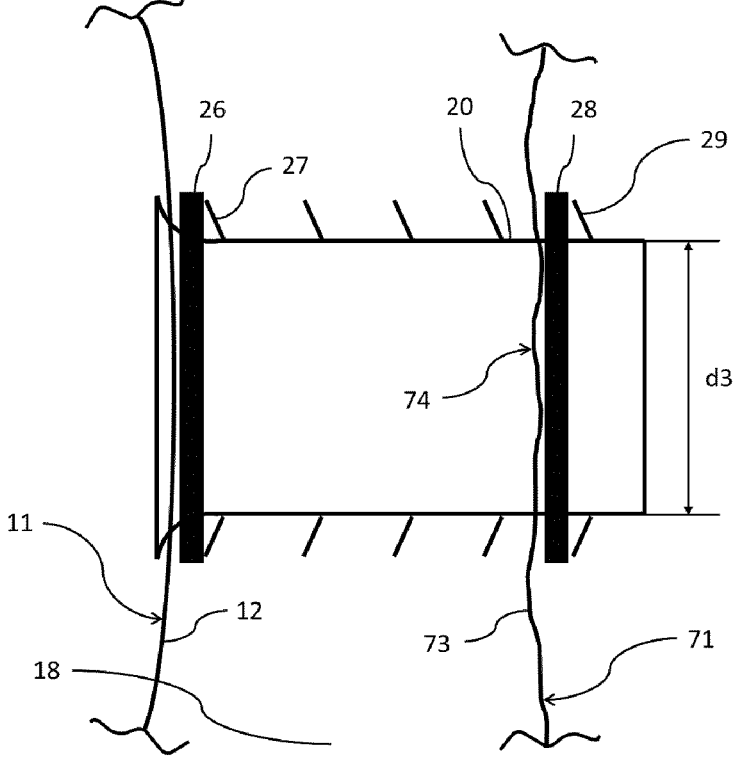
Figure 8B:
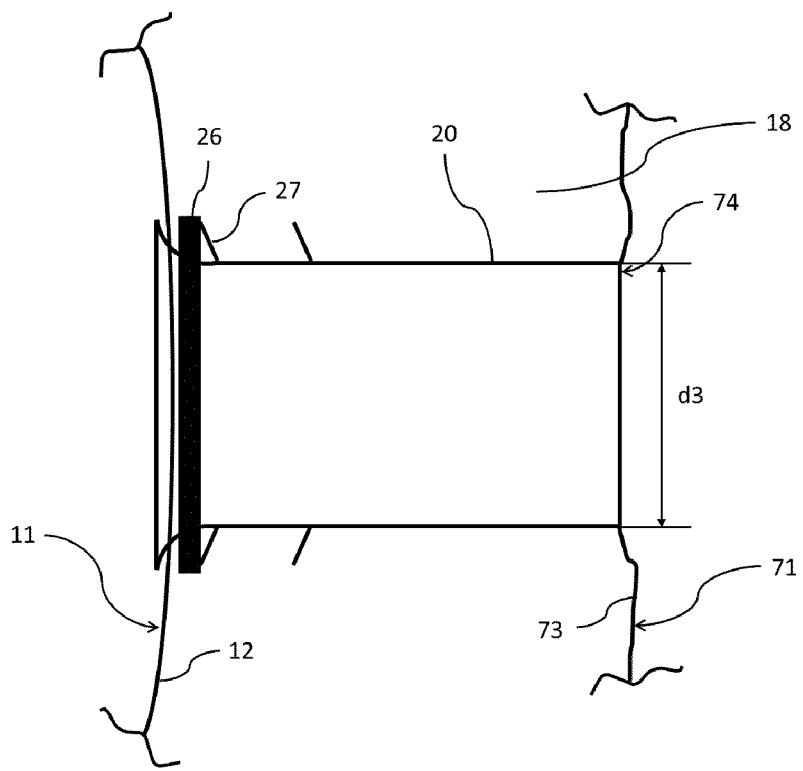

FIG. 1a: Schematic illustration of an air duct according to the invention in non-operational mode;

FIG. 1b: Schematic illustration of an air duct according to the invention in operational mode;

FIG. 2: Schematic illustration of a longitudinal section of a nozzle for an air duct according to the invention;

FIG. 3: Illustration of nozzles on an air duct according to the invention;

FIG. 4a: Embodiment of an air duct according to the invention comprising a suspension top part and one set of nozzles on each side of the air duct's main body;

FIG. 4b: Cross section of an embodiment of an air duct comprising nozzles on each side of the air duct's main body;

FIG. 5: Schematic illustration of a longitudinal section of a nozzle comprising retaining elements and a latching element for an air duct according to the invention;

FIG. 6: Schematic illustration of an embodiment of an air duct comprising a fin;

FIG. 7: Schematic illustration of a cross section of a multilayer air duct according to the invention;

FIG. 8a Schematic illustration of an embodiment of a convection between a nozzle and the enclosing body in a multilayer air duct according to the invention;

FIG. 8b Schematic illustration of another embodiment of a connection between a nozzle and the enclosing body in a multilayer air duct according to the invention.

FIG. 1a shows a schematised computer design of the air duct (10) according to the invention with one set of nozzles (20) extending radially from the outer surface of the main body (11). The cross-sectional area (A) of the main body (11) tapers from the first end (14), i.e. the inlet opening of the conduit, towards its longitudinally opposite second end (15). The air duct (10) comprises three segments (17, 17') which are connected end-to-end with a common longitudinal axis (X). In FIG. 1a, the air duct (10) is portrayed in non-operational phase, i.e. when conditioned air does not flow out of the nozzles (20).

FIG. 1*b* shows the same schematic version of the air duct (10) portrayed in FIG. 1*a* but this time in operation, i.e. with air leaving the air duct through the nozzles (20), as indicated by the arrows. The individual segments (17, 17') are each configured to form an extended segment with decreasing cross-sectional area towards the second end (15), and the second end (15) is formed as a closed end wall so that a substantially identical outflow pressure of all individual flows of the conditioned air from the nozzles (20) is generated, as illustrated by the same length and thickness of the arrows.

FIG. 2 illustrates a longitudinal section of a nozzle (20) used in an embodiment of the air duct (10) disclosed herein. In this example, the nozzle (20) is integrally connected to the tapered segment (17) of the air duct's main body (11), i.e. the nozzle (20) and the main body (11) are made from one piece of material. The nozzle (20) comprises a cylindrical region (24) and a transition region (25) adjacent thereto. The cylindrical region (24) features a constant diameter corresponding to the outlet diameter (d2), i.e. the diameter of the air outlet opening (22) of the nozzle (20), whereas the cross-sectional area of the nozzle (20) increases in the transition region (25) towards the tapered segment (17) of the main body (11). The air inlet diameter (d1) of the nozzle's air inlet opening (21) is measured at the end of the radius (r). The nozzle (20) further comprises an inner surface (23) which, in this embodiment, is identical to the inner surface (13) of the main body (11). The cross-sections corresponding to the substantially circular air outlet opening (22) and the substantially circular air inlet opening (21) are spaced parallel to each other at a distance h, wherein said distance corresponds to the length of the nozzle (20) or the sum of the lengths of the cylindrical region (24) and the transition region (25), respectively.

FIG. 3 shows a more detailed illustration of nozzles (20) connected to the outer surface (12) of the main body (11) of an air duct (10) according to the invention. The inside of each nozzle (20) comprises a cylindrical region (24) with a constant diameter corresponding to the outlet diameter (d2) of the air outlet opening (22) and a transition region (25) facing the main body (11) or a segment (17) thereof. In the transition region (25), the inner diameter of the nozzle (20) increases towards the main body (11) with a radius (r) to reach inlet diameter (d1) at the level of the main body's inner surface (13). Hence, the cross-sectional area of the air inlet opening (21) is larger than the cross-sectional area of the air outlet opening (22), wherein the imaginary planes corresponding to both openings (21, 22) are spaced parallel to each other at a distance h. The nozzle (20) may further comprise angled sections for fixing on the outer surface (12) of the main body (11), e.g. by gluing or welding.

FIG. 4*a* shows an embodiment of an air duct (10) according to the invention. A cross-sectional view of the air duct (10) of FIG. 4*a* is shown in FIG. 4*b*. In this embodiment, the air duct (10) has a main body (11), the cross-sectional area of which decreases from the first end (14) to the second end (15), i.e. the closing end wall, in order to counteract the pressure loss of the supplied conditioned air which would otherwise happen along the direction of air flow through the main body (11) of the air duct (10). In this example, the tapered segment (17) extends over the entire length of the main body (11). Furthermore, the main body (11) is composed of a tapering bottom part (40) and a top part (30) with substantially constant cross-section along the longitudinal axis (X) of the air duct (10). Multiple middle parts (50) comprising nozzles (20) are arranged between the top part (30) and the bottom part (40) to form two sets of nozzles (20), one on each side of the median longitudinal plane (P) of the air duct (10) running through the longitudinal axis (X) of the air duct (10) vertically. The nozzles (20) of the respective sets of nozzles are arranged side by side with a certain regular distance (d) and in one row along substantially the entire length of the main body (11). Each nozzle (20) comprises an air inlet opening (21) and an air outlet opening (22) in fluid communication through which the air being conveyed in the main body (11) can exit into the greenhouse. The top part (30) may comprise means for mounting the air duct (10) to the underside of a plant table and/or means for suspending the air duct (10) from a suitable installation. The portrayed main body (11) of the air duct (10) can be created by connecting the top part (30), the middle parts (50) and the bottom part (40) by any known manner, for example by gluing or welding. The top part (30) is made of a rectangular plastic plate, e.g. made by extrusion of a thermoplastic polymer, and is adapted for the connection with the lower part of the worktable on which cultivated crops are placed. By way of example, bolts and rivets may be used to mound the air duct (10) to the underside of a plant table. However, the top part (30) may alternatively be connected to the ceiling of the greenhouse right above the cultivated crops or to horizontal hanging equipment in the greenhouse.

FIG. 5 illustrates a longitudinal section of a nozzle (20) comprising retaining elements (27) and a latching element (26) for use in an embodiment of the air duct (10) disclosed herein. In this embodiment, the nozzle (20) is inserted into holes in the main body (11) from the inside of the main body (11), i.e. the nozzle (20) is pre-fabricated and attached to the main body (11) after its production. Similar to the nozzle described in FIG. 2, the nozzle (20) of FIG. 5 comprises a cylindrical region (24) and a transition region (25) adjacent thereto. The cylindrical region (24) features a constant diameter corresponding to the outlet diameter (d2), i.e. the diameter of the air outlet opening (22) of the nozzle (20), whereas the cross-sectional area of the nozzle (20) increases in the transition region (25). The air inlet diameter (d1) of the nozzle's air inlet opening (21) is measured at the end of the radius (r). The size of the holes in the main body (11) is smaller than the inlet diameter (d1) of the nozzles (20). Preferably, the insertion of the nozzles (20) through the main body (11) can be facilitated by choosing the size of the holes such that the holes are larger than the outlet diameter (d2) of the nozzles (20) and smaller than the inlet diameter (d1) of the nozzles (20). After insertion, the nozzles (20) are fixed to the main body (11) by means of a form-locking connection. In this embodiment, the nozzle (20) is attached to the main body (11) with a snap lock convection using retaining elements (27) and a latching element (26). In the present example, the latching element (26) is formed as a ring that can only be pushed onto the nozzle (20) in one direction, i.e. from the side of the air outlet opening (22). The retaining elements (27) are designed as barbed hooks that prevent the ring from sliding off the nozzle (20) and the nozzles (20) from falling off the main body (11).

FIG. 6 illustrates an embodiment of an air duct comprising a fin (60) for suspending the air duct (10). In this embodiment, the air duct (10) comprises a main body (11) with a first end (14) and a second end (15) which extends along a longitudinal axis (X). Here, the length of the vent or nozzle containing segment (L2) corresponds to the overall length of the main body (L1). Hence, the main body (11) has a substantially circular cross-section which decreases from the first end (A1) to the second end (A2). Multiple nozzles (20) are arranged in one row along the main body (11), wherein the nozzles (20) are evenly spaced at intervals (d). In the main body (11) further comprises a fin (60) for suspending the air duct (10). The fin (60) extends in longitudinal direction (X) of the main duct (11) and comprises a plurality of reinforced apertures (61) which are disposed along the fin (60). The fin (60) and the main body (11) are formed in one piece.

FIG. 7 shows a cross section of a multilayer air duct as disclosed herein. The air duct comprises a hollow enclosing body (71) with an outer surface (72) and an inner surface (73). In the present example, the enclosing body (71) encloses the main body (11) over substantially the entire length of the main body, i.e. from the first end to the second end of the main body, and tapers like the main body (11) such that a gap (18) is formed between the inner surface (73) of the enclosing body (71) and the outer surface (12) of the main body (11). In the present example, the nozzles (20, 20') protruding from the outer surface (12) of the main body (11) extend through vents (74, 74') in the enclosing body (71) and protrude from the outer surface (72) of the enclosing body (71). The interior volume of the main body (11) is in fluid communication with the environment (100) via the nozzles (20, 20').

FIG. 8a shows a more detailed schematic illustration of an embodiment of connection between a nozzle (20) and the enclosing body (71) in a multilayer air duct (10) as disclosed herein and in a longitudinal section along the dashed line B-B in FIG. 7. In the embodiment shown in FIG. 8a, both the main body (11) and the enclosing body (71) are made from a substantially air-impermeable plastic film, e.g. a polyethylene film. The nozzles (20) are inserted through vents in the main body (11) and fixed to the main body (11) by means of a snap lock connection consisting of a ring acting as latching element (26), which ring is brought into effective connection with a barb acting as retaining element (27) for the latching element (26). Similarly, the nozzles (20) are inserted through vents (74) in the enclosing body (71). The diameter (d3) of the vents (74) in the enclosing body (71) corresponds approximately to the outer diameter of the nozzles (20) or is slightly larger in order to facilitate the insertion of the nozzles (20) through the respective openings (74) in the enclosing body (71). The nozzles (20) are then fixed to the enclosing body (71) by means of a snap lock connection consisting of a second ring acting as latching element (28) and a second barb acting as retaining element (29), the barb being arranged on the nozzle (20). Of course, it is also conceivable that the nozzles (20) protrude from the outer surface (72) of the enclosing body (71) and that the enclosing body (71) is connected to the nozzles (20) in some other way, in particular by bonding or welding.

FIG. 8b illustrates another embodiment of a connection between a nozzle (20) and the enclosing body (71) in a multilayer air duct (10) as disclosed herein, wherein the nozzles (20) protruding from the outer surface (12) of the main body (11) open into vents (74) in the enclosing body (71). In this embodiment, the enclosing body (71) is attached to the end of the nozzle (20) facing away from the main body (11), in particular by gluing or welding. Of course, it is also conceivable that the main body (11) and the nozzles (20) are made in one piece and that the enclosing body (71) is subsequently attached to the nozzle outlet opening. The vents (74) may be prefabricated and correspond substantially to the outer diameter of the nozzles (20), or they may be produced after the enclosing body (71) has been attached to the nozzles (20), for example by punching or piercing the enclosing body (71) at the desired locations.

The operation of the air duct (10) is as follows: Conditioned air, i.e. air having a pre-determined air humidity and/or temperature, is supplied to the first end (14) of the main body (11), for example by means of a ventilator powered by an electric motor (not portrayed). The conditioned air is conveyed by the ventilator through the main body (11) in the direction of the second end (15) of the main body (11). Given the narrowing diameter of the main body (11), the conditioned air flows through all nozzles (20) under similar pressure which ensures identical cultivation conditions for all crops placed in the cultivation space of the greenhouse, regardless of the distance of individual crops from the first end (14) of the air duct (10).

In general, the main body (11) can have any cross section. However, from a production perspective, circular, elliptical, square or rectangular cross-sections are feasible and circular cross-sections are preferred. The nozzles' (20) air outlet diameter (d2) is preferably comprised between 1 cm and 5 cm and the total sectional area of all the nozzles (20) is bigger than or equal to the output sectional area of the ventilator driving the conditioned air in the air duct (10). The nozzles (20) may be manufactured from any suitable material, including plastic or metal. The conduit is manufactured from plastic, particularly form gas-tight plastic film. Self-supporting stability of the conduit is particularly important when the air duct (10) is not suspended but rather placed on the ground. For this reason, the main body (11) may be fitted with form-retaining elements (not shown) which will prevent the collapse of the main body (11) when not in use, for example by stretching the main body (11) or pressing against the interior surface (12) of the main body (11).

In the following, the technical effect of the present invention shall be further illustrated by two concrete examples of application, without limiting the invention to the values given in the examples:

EXAMPLE 1

Air ventilation into the cultivation space of a 16 meter long greenhouse was performed using a 15 meter long experimental air duct suspended by its suspension part under an equally long worktable full of tomato nursery plants. The cross-section of the first end of the air duct was 0.63 m$^2$, and the cross-section at the closed second end wall was 0.35 m$^2$. At each lateral side of the main body, a number of simple holes, each having a cross-section surface of 3.14 cm$^2$, was cut from the main body. The regular distance between these holes was 20 cm. Air with a relative humidity of 80% was blown in the first end of the air duct using an electrically powered ventilator. The level of humidity and temperature of the cultivation space was measured using LUTRON HT-3009 LUTRON HT-3009 hygrometers placed in 1 meter distances among the tomato plants. The electricity consumption was recorded over one hour of operating the air duct.

EXAMPLE 2—ACCORDING TO THE INVENTION

Air ventilation into the cultivation space of a 16 meter long greenhouse was performed identically as in the above example 1 using a 15 meter long experimental air duct suspended under an equally long worktable full of tomato nursery plants and under identical air ventilation conditions. Contrary to the previous example 1, the simple holes of the air duct were equipped with nozzles as described herein having a circular cross-section at the air inlet opening of 3.14 cm$^2$ and a length of 3 cm. The cross-section at the vent was slightly smaller compared to the cross-section at the air inlet opening. During one-hour operation of the ventilator and under identically humid air ventilation into the cultivation space of the greenhouse on the level of tomato nursery plants (measured in the same manner as in example 1), savings of 52% of electricity consumed by the electric motor of the ventilator was achieved in comparison to example 1.

The invention claimed is:

1. An air duct for distributing air in a greenhouse, the air duct comprising a hollow main body extending along a longitudinal axis and at least one set of vents, wherein the main body has an outer surface and an inner surface, a first end and a second end at the opposite longitudinal ends of the main body, and a segment disposed between the first end and the second end, wherein a cross-sectional area of the main body in said segment decreases over the whole length of this segment towards the second end, and wherein vents belonging to a respective set of vents are distributed at intervals over substantially the entire length (L2) of said segment, wherein at least said segment of the main body is made of a substantially air-impermeable plastic film, and wherein the vents are configured as nozzles protruding from the outer surface of the segment.

2. The air duct according to claim 1, wherein the vents of a respective set of vents in said segment are arranged on a geodesic line when the air duct is used as intended.

3. The air duct according to claim 1, wherein the cross-sectional area (A) of the segment is configured to maintain uniform static pressure along the length of the segment.

4. The air duct according to claim 3, wherein the cross-sectional area is determined by equation (1):

$$\frac{A}{A_L} = \left\{ \left(1 + \frac{fL}{2D_L}\right)\left(\frac{x}{L}\right)^{1/2} - \frac{fL}{2D_L}\frac{x}{L} \right\}^2 \tag{1}$$

and factor f used in equation (1) to calculate the change in cross-sectional area along the segment is additionally based on equation (2):

$$f = \frac{0.25}{\log\left(\frac{\varepsilon/D}{3.7} + \frac{5.74}{Re^{0.9}}\right)^2} \tag{2}$$

with
f=friction factor,
ε=absolute roughness coefficient,
D=cross-sectional diameter of the segment,
Re=Reynolds number.

5. The air duct according to claim 1, wherein vents belonging to a respective set of vents are equally spaced from one another, wherein the interval (d) between adjacent vents of a respective set of vents is between 5 mm and 100 mm, measured from the respective centers of the vents.

6. The air duct according to claim 1, wherein the at least one set of vents comprises two sets of vents, wherein the two sets of vents are arranged substantially mirror-symmetrical to a median longitudinal plane (P) of the air duct.

7. The air duct according to claim 1, wherein the nozzles each have a substantially circular air inlet opening with an inlet diameter (d1) at the level of the main body's outer surface, a substantially circular air outlet opening spaced substantially parallel to said air inlet opening and having an outlet diameter (d2), and a perpendicular distance (h) between the air inlet opening and the air outlet opening, wherein the air inlet opening is larger than the air outlet opening and wherein the ratio between the perpendicular distance (h) and the outlet diameter (d2) is between 0.5 and 3.

8. The air duct according to claim 1, wherein the inner surface of each nozzle comprises a cylindrical region with a substantially constant inner diameter and a transition region in which the inner diameter increases towards the main body, wherein the inner diameter of the cylindrical portion corresponds to the diameter (d2) of the air outlet opening and wherein the radius (r) of said transition region is between 0.05 and 0.5 of the outlet diameter (d2).

9. The air duct according to claim 1, wherein at least the segment and the nozzles, are formed in one piece.

10. The air duct according to claim 1, wherein the main body comprises a plurality of segments which are connected to each other end-to-end in a sealed manner or are connectable to each other end-to-end in a sealed manner.

11. The air duct according to claim 1, wherein the air duct further comprises a hollow enclosing body having an outer surface and an inner surface, the enclosing body enclosing the main body at least partially in the direction of the longitudinal axis of the main body, wherein the main body and the enclosing body are connected to each other via at least some of the nozzles of the main body, wherein the nozzles protruding from the outer surface of the main body are open into vents in the enclosing body and/or extend through the vents in the enclosing body and protrude from the outer surface of the enclosing body in such a way that the interior volume of the main body is in fluid communication with the environment via the nozzles.

12. The air duct according to claim 11, wherein the enclosing body is comprised of plastic.

13. The air duct according to claim 11, wherein the nozzles are fixed to the enclosing body by means of at least one of a form-locking connection and a joining method.

14. The air duct according to claim 11, wherein the connection between each of the nozzles and the enclosing body is formed to be gas-tight.

15. A greenhouse comprising at least one air duct according to claim 1.

16. A method for distributing air with an air duct according to claim 1 in a greenhouse, the method comprising the steps of:

providing conditioned air with at least one of pre-determined humidity and pre-determined temperature at the first end of the air duct;

conveying said conditioned air from the first end in the direction of the second end of the air duct, by means of an electrically powered ventilator arranged upstream of the air duct; and supplying said conditioned air into the growing section of the greenhouse via the vents, whereby the air flow exiting through the vents is essentially the same between all vents.

* * * * *